Patented June 30, 1936

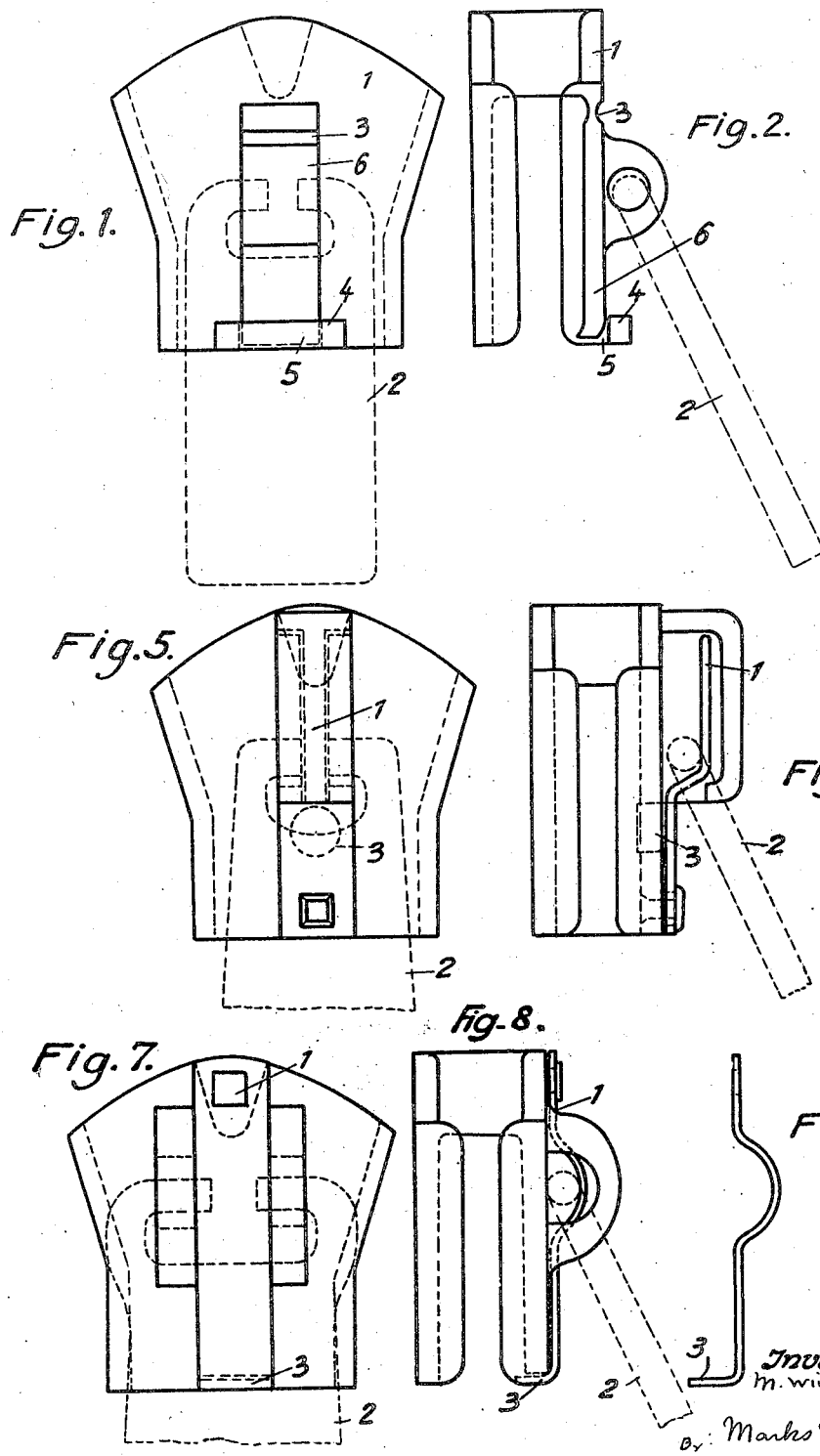

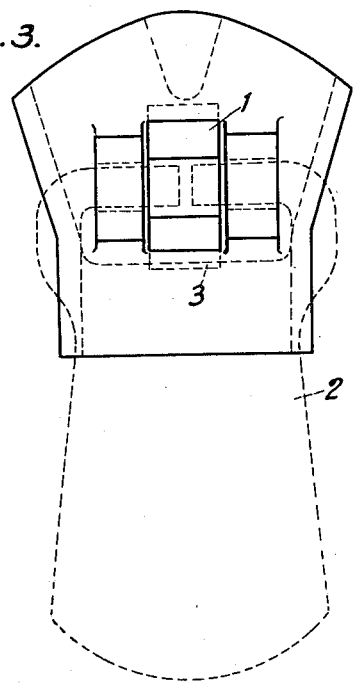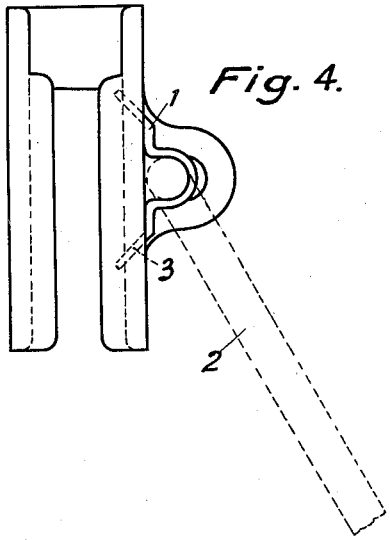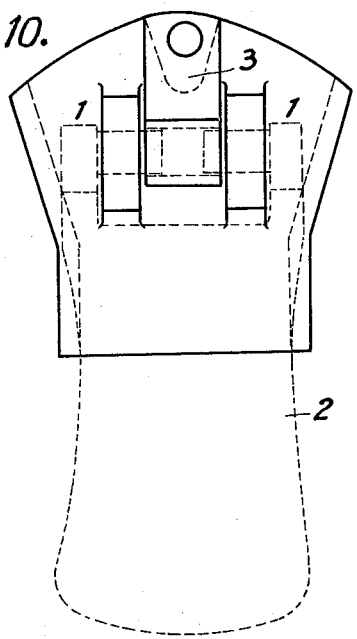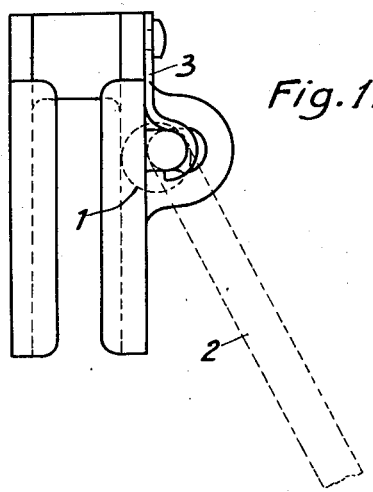

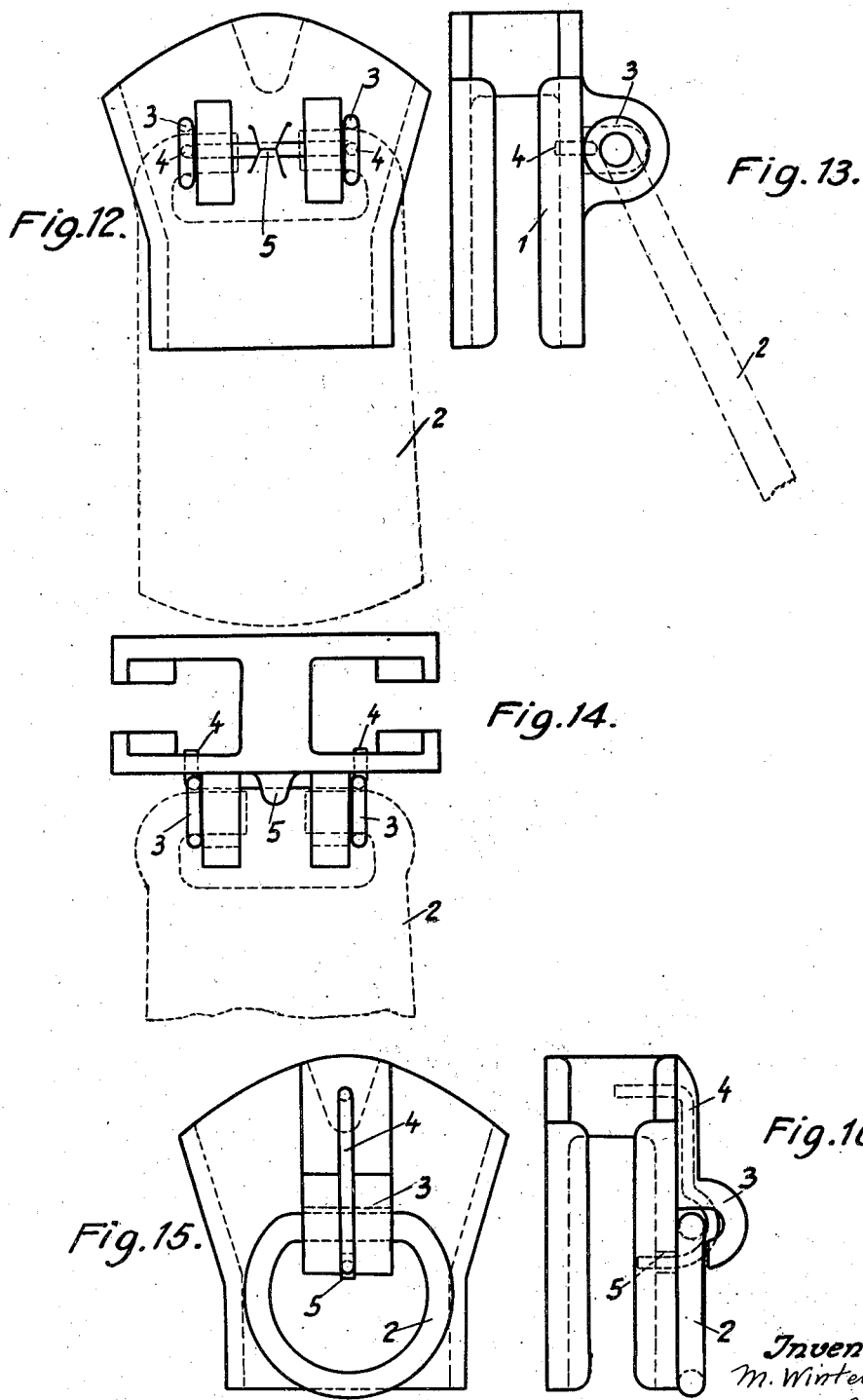

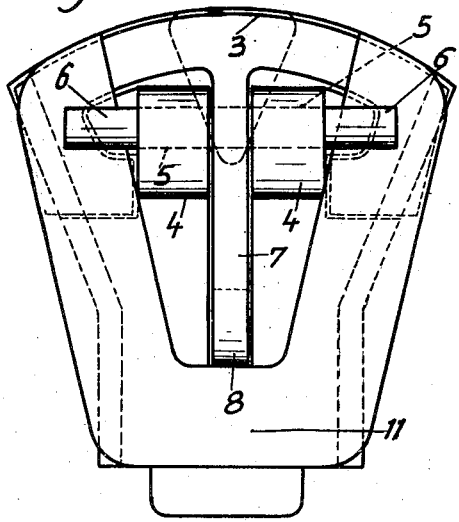
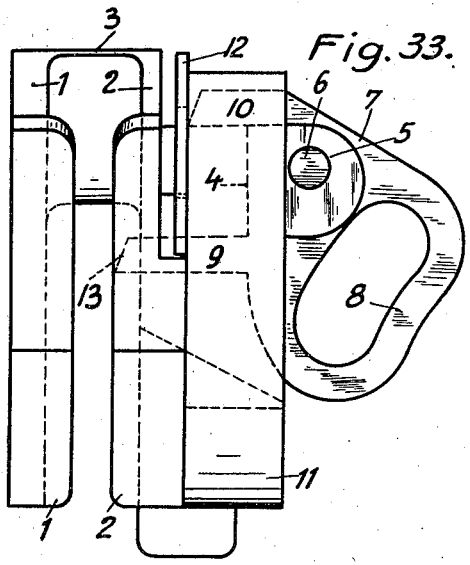
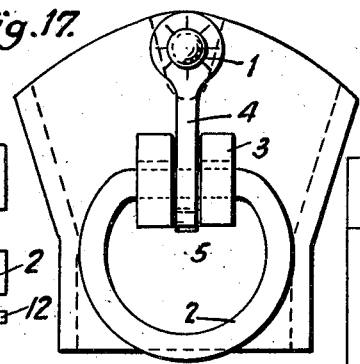
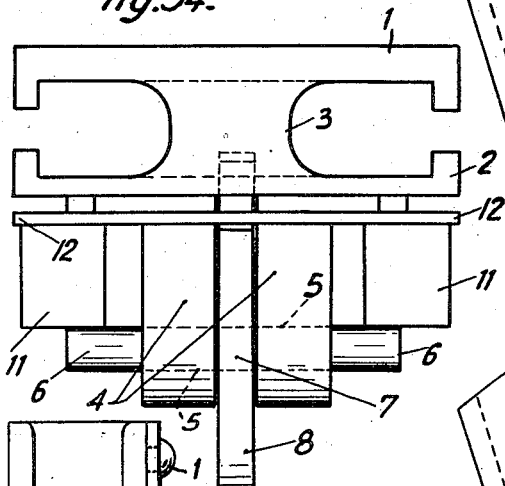
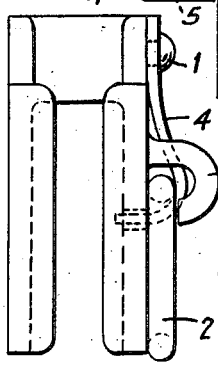
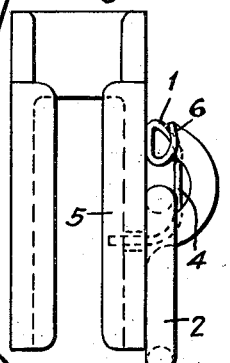
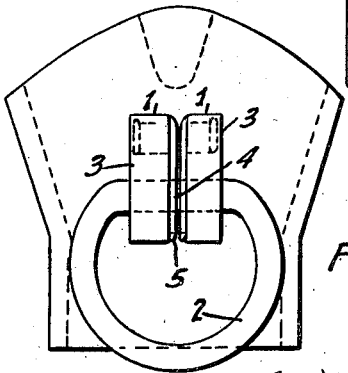

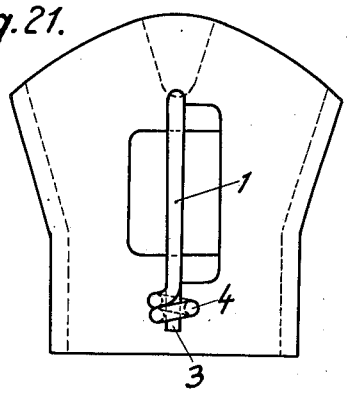
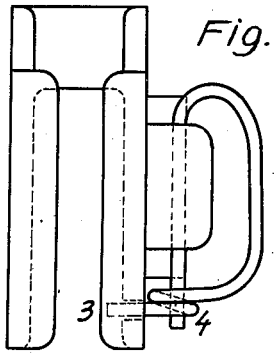
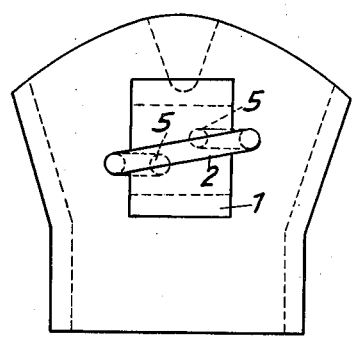
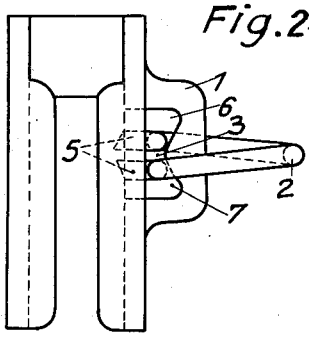
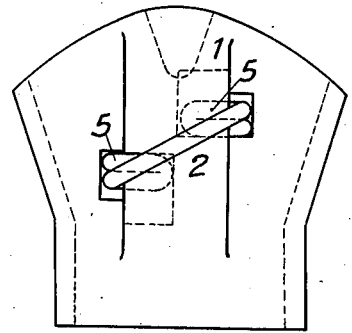
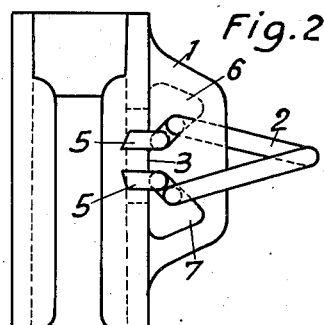

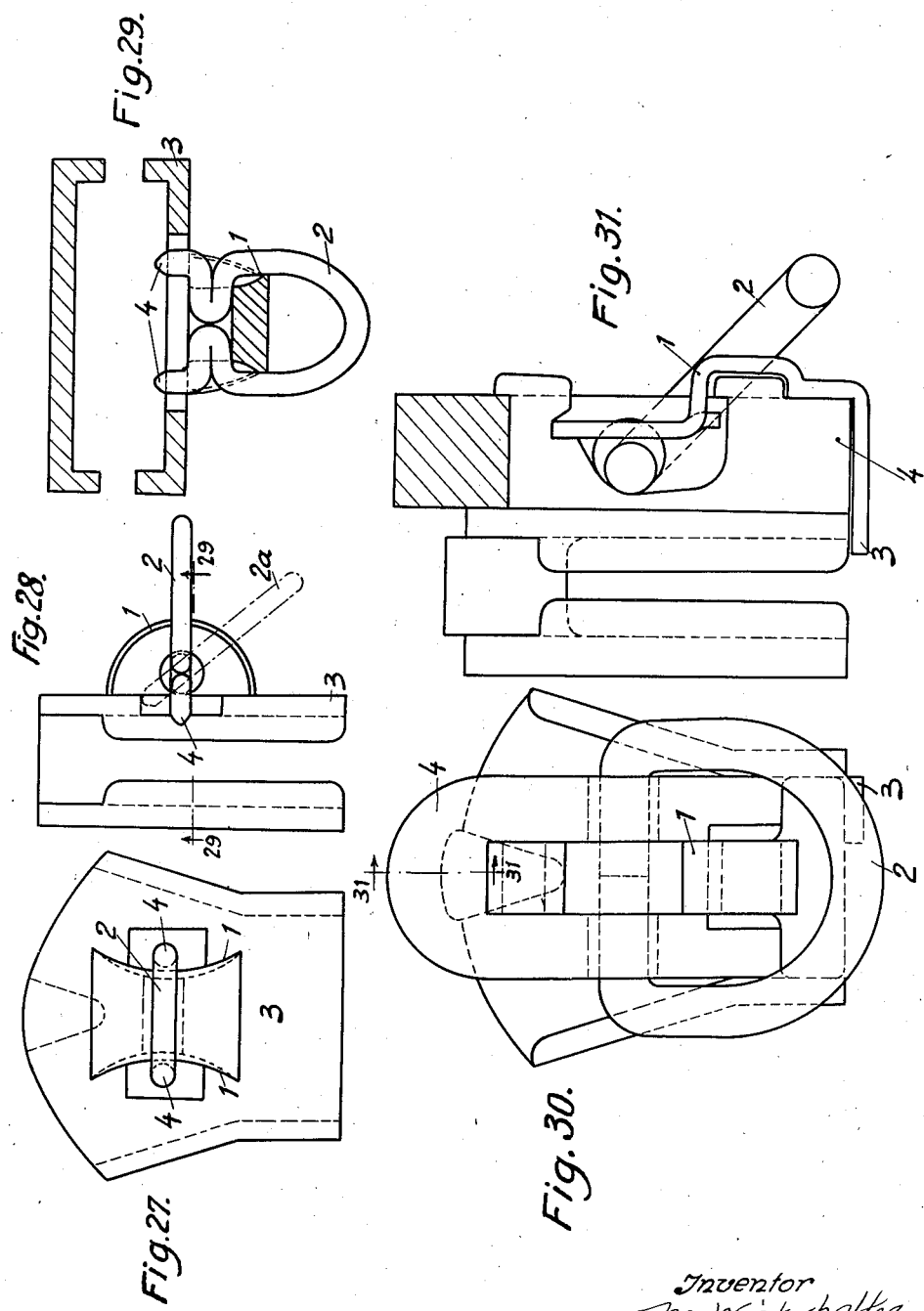

2,045,626

UNITED STATES PATENT OFFICE 2,045,626

SEPARABLE FASTENER SLIDER

Martin Winterhalter, St. Gallen, Switzerland

Application November 11, 1932, Serial No. 642,310
In Germany November 13, 1931

8 Claims. (Cl. 24—205)

As is known separable fasteners are opened and closed by means of a slider. A drawback of the sliders of the usual form is, that the slider is forced downward and the closed fastener is opened when the ends of the stringers are pulled apart. It has been proposed to remove this drawback by using lockable sliders. In sliders of this kind, when the pull device is laid over, a cam will be forced in between two adjacent locking members, whereby the slider is rigidly held also in this position.

Other sliders of known kind are arrested by turning the pull device one half or one quarter of a revolution about an axis, which is perpendicular to the closure line. In these known constructional forms a special manipulation is necessary in order to lock the slider, and if it is forgotten to lay over the pull device or to turn it in the manner mentioned above, the fastener may easily be opened.

The slider according to the present invention is operated in the same manner as sliders of known kind when the fastener is opened or closed, i. e. when the slider is moved, the fastener is opened or closed in accordance with the direction of the movement. It is, however, impossible to dislocate the novel slider by pulling at the ends of the totally or partially closed fastener. The slider will, without any particular manipulation, in any position automatically arrest itself in such a manner that no involuntary dislocation of the same will take place.

The problem, on which the present invention is based, may be solved in numerous different ways. Some constructional forms of the invention are shown schematically by way of examples in the accompanying drawings in which, Figs. 1, 3, 5, 7, 10, 12, 15, 17, 19, 21, 23, 25, 27, 30, and 32 are front views of sliders showing various forms in which my invention may be applied thereto;

Figs. 2, 4, 6, 8, 11, 13, 16, 18, 20, 22, 24, 26, 28, and 33 are side views respectively of the slider structures of Figs. 1, 3, 5, 7, 10, 12, 15, 17, 19, 21, 23, 25, 27, and 32;

Fig. 9 is a lateral edge view of the spring employed in the structures of Figs. 7 and 8;

Fig. 14 is a view looking at the upper end of the slider of Figs. 12 and 13;

Fig. 29 is a section taken substantially on the line 29—29 of Fig. 28;

Fig. 31 is a side view of the structure of Fig. 30 but shows the magnet in section on the line 31—31 of said Fig. 30; and Fig. 34 is a view looking at the upper end of the slider structure of Figs. 32 and 33.

According to Figs. 1 and 2 the slider is equipped with a cover plate or front wall 1, which is formed with an integral portion 6 separated along the sides from the rest of the slider front wall so as to form a tongue which remains attached at one end and at the other end is free and provided with an inturned portion 5 which normally projects between the fastener elements and prevents involuntary dislocations of the slider. The tongue 6 at the attached end is weakened or reduced in thickness as at 3, to give flexibility to the tongue 6, and the pull member is attached to this tongue so that an outward pull on the pull member 2 will release the locking portion 5 from engagement with the fastener elements, so that the slider may be moved, a bridge member 4 being provided at the lower end of the slider and extending over the locking end 5 of the tongue 6 to limit the outward movement of the tongue.

Figs. 3 and 4 show another constructional form, comprising a spring 1, the one end of which penetrates the cover plate and projects into the intermediate space between two adjacent locking members. When the device 2 is pulled (see Fig. 4) the spring 1 is lifted and the end 3 of the same is brought out of engagement with the locking members, so that the slider may be moved in any desired direction.

Figs. 5 and 6 show still another constructional form of the slider according to the invention. This slider is equipped with a spring which carries a special pin 3, which when in normal position penetrates the cover plate and engages between the locking members or exerts a pressure against the same. The pull device 2 is arranged below the spring. When the fastener is operated by means of the pull device, the spring is lifted and the pin 3 is brought out of engagement with the locking members.

In Figs. 7, 8, and 9 the spring is not passed through the cover plate but the end of the same is bent at 3 in such a manner, that this end embraces the cover plate. This arrangement is clearly shown in Fig. 9. When the pull device 2 is operated, the spring is lifted and brought out of engagement with the locking members.

Figs. 10 and 11 show a slider, the pull device 2 of which at 1 is equipped with one or more eccentric reinforcements, which project through corresponding openings in the cover plate of the slider. The device 2 is by means of a spring 3 held in normal position in such a manner that the eccentric projection presses against the locking members and prevents any movement of the slider. When the fastener is operated by lifting the device 2 also the eccentric reinforcements are turned which are rigidly connected to the shaft of the device 2. Hereby the pressure is removed from the locking members and the fastener is released.

Figs. 12, 13, and 14 show a slider, the pull device 2 of which, for instance on both sides of the shaft, is equipped with rings 3. These rings are formed with pins 4 and are interconnected by means of a rib or the like, the central part of which is yieldingly seated for instance at 5 (Fig. 14). When the device 2 is pulled the rings together with the pins are lifted and the slider is released. On account of the yielding bearing the rings and the pins will automatically return into normal position as soon as the pull on the device 2 ceases.

According to Figs. 15 and 16 the pull device 2 of the slider is arranged below the strap 3 and is held by means of a spring 4, the part 5 of which is of curved shape. This end 5 of the spring prevents a dislocation of the slider. When the pull device is actuated the spring 4 is lifted and the end 5, which is passed through a corresponding opening in the cover plate is brought out of engagement with the locking members. The spring 4 may be connected to the slider in any convenient manner, for instance in the manner shown in Figs. 17 and 18, the reference numerals of which for the greater part are identical with the reference numerals in Figs. 15 and 16. At 1 the spring 4 is riveted to the slider.

Figs. 19 and 20 show a separable fastener slider, the pull device 2 of which has inturned ends engaged with laterally spaced loops 3 on the front of the slider. At the upper end each loop 3 is undercut at the outer side and formed with a V-notch 6. A doubled spring wire 4 extends between the loops 3 and has the lower looped end projecting inwardly through an opening in the front wall of the slider, while the ends of the wire are bent laterally at opposite directions beyond the upper ends of the loops 3 and each wire terminates in a single coil which fits in the undercut recess of the respective loop 3 and has a V-shaped portion which engages in the V-notch 6 of the respective recess so as to retain the spring in place and impose a tension thereon to hold the locking end of the spring member in the locking position projecting through the wall of the slider. The inturned ends of the pull member 2 engage under this spring so that outward pull on the member 2 releases the lock.

Figs. 21 and 22 show a similar arrangement in which the spring 1 proper is formed in the manner shown at 4 and may serve as the pull device or as a strap for an attached pull device (not illustrated). When the pull device is operated (which is suspended from the yielding strap 1), the end 3 of the spring is lifted and the fastener is released. This form of the invention is particularly simple and may be produced at very low costs.

Figs. 23 and 24 show a fastener having a strap 1 which at 3 is formed in a manner differentiating considerably from the arrangements described above. The strap 1 carries a yielding pull device 2, which is equipped with locking members 5 that are passed through corresponding openings in the cover plate of the slider. On account of the yielding nature of the member 2 the ends of the same show a tendency to move towards each other. On account of the peculiar shape of the strap 1 and the yielding nature of the member 2 the latter is in normal position always held in the position shown in the drawings, in which the pins 5 arrest the slider. When the device 2 is operated, directly by hand or by means of an attached element, the device 2 is partially deflected in such a manner that also the pin 5 is deflected. Simultaneously the yielding device 2 is widened on account of the peculiar shape of the strap 1 and the ends of the spring will slide into the positions 6 and 7, whereby the locking pins 5 are lifted and are brought fully out of engagement with the locking members, so that the slider is released.

Figs. 25 and 26 show a similar form of the slider. The reference numerals of these figures are identical with those in Figs. 23 and 24, and it is not thought necessary to describe this form of the invention in detail. The strap 1 is at 3 not curved in the manner shown in Figs. 23 and 24, but is at this point rigidly connected to the cover plate of the slider. The pull device 2 is inclinedly arranged and the pins 5 are located in the manner made apparent in the drawings.

Figs. 27, 28, and 29 also show a yielding pull device 2, the ends 4 of which project through the cover plate 3. The strap 1, from which the device 2 is suspended, is bent inward in the manner indicated in Fig. 27. When the slider is operated and the device 2 is brought into the position indicated at 2a in Fig. 28, the ends 4 are brought out of engagement with the locking members, and the slider is released. On account of the curved shape of the strap 1, the yielding member 2 is, however, in the position 2a strained in such a manner that it, when released, on account of the spring pressure, automatically returns to position 2 in which the straining force is of minimum value. Through this movement, the slider is automatically arrested.

Figs. 30 and 31 show a particularly original solution of the problem in question. According to these figures a small permanent magnet 4 is mounted on the front wall of the slider and has the inturned ends of the pull member 2 engaged through relatively large bearing openings in the side legs of the magnet so that there is some freedom of outward movement of said inturned ends. A strap 1 of magnetic material is mounted so that the inturned lower end or projection 3, is normally held by the magnet 4 in engagement with the fastener elements to prevent displacement of the slider, a portion of the strap 1 being located over the inturned ends of the pull device or handle 2 so that outward pull on the latter swings the strap 1 outwardly against the magnetic tension of the magnet 4 and releases the projection 3 from the fastener elements so that the slider is free to move.

It is also within the scope of the invention to lock or release the slider by means of a lever arrangement, comprising one or several pins projecting through the cover plate and engaging the locking members in such a manner that the slider is arrested. The main advantage of this lever device is, that the relation between the same and the cover plate may be arranged in accordance with the purpose for which the slider is designed. A slider construction of this kind is illustrated in Figs. 32, 33, and 34.

In Figs. 32, 33, and 34 1 denotes the bottom plate and 2 the cover or top plate of the slider. These plates are interconnected by means of a spreader neck 3. On the cover plate 2 for instance are two laterally spaced attaching lugs 4 with pivot openings 5 for a pin 6 which serves as a shaft for a locking lever or latch 7. This locking lever, which may have a grip portion 8, is equipped with pins 9 and 10, which may be arranged adjacent the said shaft on different sides of the same. 11 is a small magnet, for instance a horse-shoe magnet which is secured onto the front wall of the slider and straddles the lugs 5, and under the pole ends of this magnet is a recess for an armature plate 12 which is maintained in the recess and free to move laterally to and from the pole ends of the magnet. The pin 10 of the lever 7 engages the outer face of the plate 12 and when the armature plate 12 is drawn toward the pole ends of the magnet 11, the lever 7 is rocked so as to force the pin 9 inwardly to the locking position. When a pull is exerted on the device 8, the lever 7 is rocked on the pivot 6 so that the locking pin 9 is lifted and brought out of engagement with the locking members or fastener elements, whereby the slider is released and at the same time the pin 10 is depressed and forces the armature 12 away from the pole ends of the magnet. When the pull device 8 is released, the small plate 12 is again attracted by the magnet, whereby the pin 10 and the pin 9 are brought back into their original position and the slider is arrested. It is of particular importance that the lever device may be arranged in any desired position with relation to the base plate 1 and the cover plate 2 of the slider. If for instance the fastener arrangement takes up a substantially vertical position (for instance at a pullover), the lever device may take up the position indicated in the figures. If, however, the fastener is arranged in breeches or the like, the device will have to be arranged in inverse manner, i. e. in such a manner that the slider, at closed fastener, is located at the lower end of the closure slit. In this case the lever device may be arranged in such a manner, that the pin 10 is located at the lower end and the pin 9 at the upper end of the device. When the separable fastener is used in connection with pockets in garments and the like, it is horizontally arranged, and in this case the lever device will have to be turned about 90° (in Fig. 32 about an axis perpendicular to the plane of the drawing), so that the pins 9 and 10 again are located on a vertical line in spite of the horizontal position of the fastener. It is, therefore, also in this case possible to utilize, for instance, the weight of the member 8 for returning the parts to the original position after each operation of the device.

The end of the latch 9 has preferably the form of a knife edge. As indicated in Fig. 33, one face of the edge is substantially perpendicularly directed to the fastener, whereas the other face 13 is inclined with relation to the plane of the fastening device. In a partially closed fastener, the inclined face of the edge points towards the open end of the device and when the fastener is closed, the slider may easily be moved even if the latch is not completely separated from the locking members. The inclined face will (when the slider of Fig. 33 is moved upward) easily slide over the individual locking members and lift the lever device. An opening of the fastener is, however, not possible without operating the pull device, since the edge of the pin 9 will engage between the locking members and hold the slider securely when the slider is moved in the opposite direction (i. e. when the slider of Fig. 33 is moved downward).

I claim:—

1. A slider for multiple fasteners comprising a slider body with a front wall to which a slider operating handle is directly attached, the portion of said wall to which said handle is attached being movable independently of and forwardly from the rest of said front wall and constituting a resilient slider lock, the front wall including the slider locking portion thereof occupying substantially the same plane.

2. A slider for multiple fasteners comprising a slider body with a front wall having a partially separated portion thereof which forms a slider lock, and a pull member attached directly to said portion, said pull member being operable while in any position of its pivotal movement to optionally release or permit locking operation of the slider lock.

3. A slider for multiple fasteners having a front wall with a partially separated tongue-like portion thereof having a weakened connection at the attached end permitting operation of said tongue-like portion as a resilient slider lock, and a pull member attached directly to said tongue-like portion, said pull member being operable while in any position of its pivotal movement to optionally release or permit locking operation of the slider lock.

4. A slider for multiple fasteners comprising a slider body with a pair of projecting lugs on the front, a spring between said lugs and having a portion projecting into the interior of the slider, and a pull member pivoted on said lugs and engaged with the spring for moving the latter outwardly therewith.

5. In a slider for multiple fasteners, the combination of a slider body having front and rear walls spaced apart and of a form to conjointly provide channels therebetween for the multiple fasteners and said front wall being formed at its outer side with an outwardly projecting lug, a slider operating handle pivoted directly to the lug, locking means releasable by outward movement of the handle, and resilient means which opposes releasing movement of the lock, said locking means being returnable by the resilient means to the locking position in any position of pivotal movement of the handle and irrespective of the pivotal position of the handle.

6. In a slider for multiple fasteners, the combination of a slider body having a front wall, a lug integral with and extending forwardly from the front face of said wall, a slider operating handle pivoted at one end to said lug, a slider lock resiliently held in the locking position, said lock being operative to lock the slider in any position of pivotal movement of the handle and said handle being operable in any position of its pivotal movement to optionally release or permit locking operation of the slider lock.

7. In a slider for multiple fasteners the combination of a slider body having a front wall a portion of which constitutes a slider lock, and a slider operating handle attached directly to said locking portion and controlling the locking operation thereof, the front wall including the slider locking portion thereof occupying substantially the same plane.

8. In a slider for multiple fasteners the combination of a slider body having a divided front wall with a portion thereof separately movable and constituting a slider lock, a slider operating handle attached directly to said slider lock portion of the front wall and controlling the locking operation thereof, and a bridging on the slider front wall and overlying said locking portion to limit the outward movement thereof.

MARTIN WINTERHALTER.